(12) United States Patent
Yahia et al.

(10) Patent No.: US 8,364,685 B2
(45) Date of Patent: Jan. 29, 2013

(54) SYSTEM AND METHOD FOR ANNOTATION AND RANKING OF REVIEWS PERSONALIZED TO PRIOR USER EXPERIENCE

(75) Inventors: Sihem Amer Yahia, New York, NY (US); Andrei Z. Broder, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 678 days.

(21) Appl. No.: 11/965,256

(22) Filed: Dec. 27, 2007

(65) Prior Publication Data
US 2009/0171932 A1 Jul. 2, 2009

(51) Int. Cl.
G06F 7/00 (2006.01)
G06F 17/30 (2006.01)
(52) U.S. Cl. .................................................. 707/748
(58) Field of Classification Search .............. 707/732, 707/748
See application file for complete search history.

(56) References Cited

U.S. PATENT DOCUMENTS

| | | | |
|---|---|---|---|
| 6,266,649 B1 * | 7/2001 | Linden et al. ............... | 705/26 |
| 6,701,313 B1 * | 3/2004 | Smith ............................. | 1/1 |
| 7,328,216 B2 * | 2/2008 | Hofmann et al. ............. | 1/1 |
| 7,720,720 B1 * | 5/2010 | Sharma et al. ............... | 705/26 |

* cited by examiner

*Primary Examiner* — James Trujillo
*Assistant Examiner* — Jeffrey Chang
(74) *Attorney, Agent, or Firm* — Seth H. Ostrow; Ostrow Kaufman LLP (57) ABSTRACT

The present invention is directed towards methods and computer readable media for annotating and ranking user reviews on social review systems with inferred analytics. A reference framework is provided by creating context according to previous activity, bias, or background information of a given reviewer. The method of the present invention comprises receiving a first query identifying a given content item, generating a collection of content items based on one or more identical objective attributes associated with the given content item, identifying one or more subjective attributes associated with a given item in the collection of items, and providing a reference framework to interpret the subjective attributes associated with each item in the collection.

12 Claims, 6 Drawing Sheets

Pirates of the Caribbean: The Curse of the Black Pearl (2003)

Movie Overview
  Movie Main Page
  Movie Details
  Trailers & Clips
  Cast and Credits
  Awards & Nominations

Reviews and Previews
  Critics Reviews
  Basic User Reviews
  ▶ Annoted User Reviews
  Preview of Greg
  Movie Review of Mom

Photos
  Premiere Photos
  Production Photos

Community
  Message Board

| The Critics: | Yahoo! Reviewers: |
|---|---|
| 8 | 12 |
| critics reviews | 8626 reviews |

SMAC:
Johnny Depp (actor), Orlando Bloom (actor), Geoffrey Rush (actor), Action/Adventure (genre), Kids/Family (genre),

User Reviews (8626 reviews)

Better than I expected! Bruckheimer does it again
by 255-174 (2005-07-12)
7 of 8 people found this review helpful What a movie! Johnny Depp was awesome as Capt. Jack Sparrow. It was never boring. The action sequen...

| Overall Grade: | 12 | Conclusion : |
|---|---|---|
| Story: | 12 | This reviewer rated 10 Action/Adventure movies. He rates this movie better than 5 of them. He likes Action/Adventure less than the average reviewer. |
| Acting: | 13 | |
| Direction: | 12 | |
| Visuals: | 12 | |

Loved this movie!
by 255-2737 (2003-07-28)
4 of 4 people found this review helpful Pirates of the Carribean is a wonderful movie for adults and children. The skeletons may be a littl...

| Overall Grade: | 12 | Conclusion : |
|---|---|---|
| Story: | 13 | This reviewer rated 5 movies starring Johnny Depp. He rates this movie better than 4 of them. |
| Acting: | 13 | |
| Direction: | 13 | |
| Visuals: | 13 | |

Boring Movie!
by 255-56090 (2005-10-09)
2 of 17 people found this review helpful Man this thing was boring. Over hyped movie. Why did they make this crap? Disney movie are lame! Tha...

| Overall Grade: | 1 | Conclusion : |
|---|---|---|
| Story: | 8 | This reviewer rated 8 Action/Adventure movies. He rates this movie worse than 6 of them. |
| Acting: | 8 | |
| Direction: | 8 | |
| Visuals: | 11 | |

SYSTEM AND METHOD FOR ANNOTATION AND RANKING OF REVIEWS PERSONALIZED TO PRIOR USER EXPERIENCE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein generally provides methods and systems for annotating and ranking user reviews with inferred analytics. More specifically, the present invention provides methods and systems that create context for collaborative social review systems by annotating or ranking user reviews according to a bias or background information for a given reviewer.

BACKGROUND OF THE INVENTION

A number of techniques are known to those of skill in the art for providing user reviews on social review systems. The advent of the World Wide Web ("Web") has created a widespread phenomenon of such social review systems, which are essentially systems that support the reviews of particular collections of items by large, self-selected groups of non-professional reviewers. Several types of systems existed prior to the establishment of the Web as a consumer platform, such as Zagat for reviewing restaurants and Consumer Reports for reviewing products. These systems often employed cumbersome mail forms, questionnaires, or phone surveys, and the results were typically edited by professional editors. By contrast, today there are numerous online social review systems that help organize and share socially produced information valuable to assist in making purchasing decisions, choosing a movie (e.g., Yahoo! Movies), choosing services and shops, renting a DVD, buying a book, or booking travel arrangements. Such systems typically include a given collection of items, such as, books, movies, or restaurants, as well as a collection of ratings, accompanied by reviews provided by users of the system. For example, on Yahoo! Movies, a recent relatively obscure movie, La Vie en Rose, released on Jun. 8, 2007, maintained a total of 573 ratings accompanied by 89 written reviews. A more popular film, Ratatouille, attained 21,004 ratings accompanied by 1,743 user reviews, over a 6 week period. Additionally, some systems keep separate collections for professional and user-based reviews.

The prior art systems generally provide aggregation of user ratings, for example, an overall average user rating, or a ranking of a given item (book, movie, hotel, or restaurant, etc.) among a group of items. Some systems allow for multi-dimensional ratings or inputs (e.g., Zagat incorporates ratings of restaurants by quality of food, décor, service, and cost, while Yahoo! Movies incorporates ratings by story, acting, direction, and visuals) with aggregation of ratings along each dimension. Other systems provide a collaborative filtering mechanism, whereby background information for a user and prior ratings of items in a collection are stored and utilized to make future rating predictions for other users of the system.

Traditional social review systems are limited, however, in that they provide inadequate support for understanding and evaluating the numerous ratings and reviews entered by reviewers and users. For example, some reviewers are inconsistent, some have particular biases, and some have no appropriate frame of reference. Although some systems provide a measure of "usefulness" for a given review (e.g., "6 of 11 people found this review helpful"), or some other characteristic (e.g., allowing users to rate a review as useful, funny, or cool), these are merely simple aggregations of existing votes. Other systems provide for a trust system to rate reviewers, but this is a one-dimensional approach.

The ability of a user to interpret an opinion of a given reviewer is crucial to making a good decision. A user should interpret or weight a restaurant review that comes from a reviewer of discerning taste and familiarity with the relevant cuisine differently than a similar review coming for a random Web surfer that happened to wander into the restaurant. To mitigate this problem, most popular systems attempt to characterize reviewers, but this is limited in most cases to the total number of reviews written by the given reviewer. Even with the knowledge that the reviewer has written many previous reviews, it is still not a simplistic task to arrive at an informed decision. The ability for any individual to enter a review also exacerbates this problem.

To overcome shortcomings and problems associated with existing systems and methods for providing context for user reviews, embodiments of the present invention provide systems and methods for ranking and annotating reviews with inferred analytics, including reviews personalized to prior user experience.

SUMMARY OF THE INVENTION

The present invention is directed towards methods and computer readable media comprising program code for annotating and ranking a user review with automatically inferred analytics. The method of the present invention comprises generating a collection of content items on the basis of one or more objective attributes associated with a given content item. A content item may comprise an item that is typically reviewed by an individual and an objective attribute may comprise a short description that defines the given content item. One or more subjective attributes associated with a given item in the collection of items are identified, and a reference framework is provided to interpret the subjective attributes associated with each item in the collection.

According to one embodiment of the present invention, the reference framework is created by analyzing previously generated subjective attributes. The previously generated subjective attributes may comprise one or more reviews of content items entered by a user into a social review system. The subjective attributes are analyzed to define one or more socially meaningful interpretation contexts. According to one embodiment of the present invention, analyzing is performed manually by an editor. According to an alternate embodiment, analyzing is performed automatically via statistical analysis.

According to another embodiment of the invention, annotating a user review with automatically inferred analytics comprises generating an initial collection of content items on the basis of one or more objective attributes associated with a given content item, assigning a value to one or more of the one or more objective attributes, and identifying one or more subjective attributes associated with a given item in the initial collection of content items.

The method further comprises generating a socially meaningful collection of content items by culling down the initial collection of items on the basis of a range for the one or more objective attributes and a range for one or more subjective attributes, determining a context for the second collection on the basis of the values of one or more of the content items therein, and displaying the context in conjunction with the user review. According to one embodiment of the present invention, the method comprises displaying the context as an annotation. According to an alternate embodiment, invention further comprises generating the annotation via NLP synthesis.

The method of the present invention further comprises personalizing the collection of items to a prior user experience. According to one embodiment of the present invention, a user profile is created to record the prior user experience. The user profile may comprise a collection of content items associated with the prior user experience.

The computer readable media of the present invention comprises program code that when executed by a programmable processor causes the processor to execute a method for annotating a user review with automatically inferred analytics. The computer readable media comprises program code for generating a collection of content items on the basis of one or more objective attributes associated with a given content item, program code for identifying one or more subjective attributes associated with a given item in the collection of items, and program code for providing a reference framework to interpret the subjective attributes associated with each item in the collection. According to one embodiment of the present invention, the reference framework is created by analyzing previously generated subjective attributes. According to an alternate embodiment, the previously generated subjective attributes comprise one or more reviews of content items entered by a user into a social review system.

According to one embodiment of the present invention, analyzing is performed manually by an editor. According to an alternate embodiment, analyzing is performed automatically via statistical computation or analysis.

The present invention also comprises computer readable media comprising program code that when executed by a programmable processor causes the processor to execute a method for annotating a user review with automatically inferred analytics. The computer readable media comprises program code for generating a first collection of content items on the basis of one or more objective attributes associated with a given content item, program code for assigning a value to one or more of the one or more objective attributes, and program code for identifying one or more subjective attributes associated with a given item in the first collection of content items. According to one embodiment of the present invention, the subjective attributes comprise one or more components.

The computer readable media may also comprise program code for generating a second collection of content items by culling down the first collection of items on the basis of a range for the number of one or more objective attributes and a range for the number of one or more subjective attributes, program code for determining a context for the second collection based on the values of one or more of the content items therein, and program code for displaying the context in conjunction with the user review. According to one embodiment of the present invention, the computer readable media comprises program code for displaying the context as an annotation. According to an alternate embodiment, invention further comprises program code for generating the annotation via NLP synthesis.

The computer readable media of the present invention further comprises program code for personalizing the collection of items to a prior user experience. According to one embodiment of the present invention, a user profile is created to record the prior user experience.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 5 is a screen illustration of a social review system incorporating automatically inferred analytics, according to one embodiment of the present invention.

DETAILED DESCRIPTION OF THE EMBODIMENTS

In the following description of the embodiments of the present invention, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
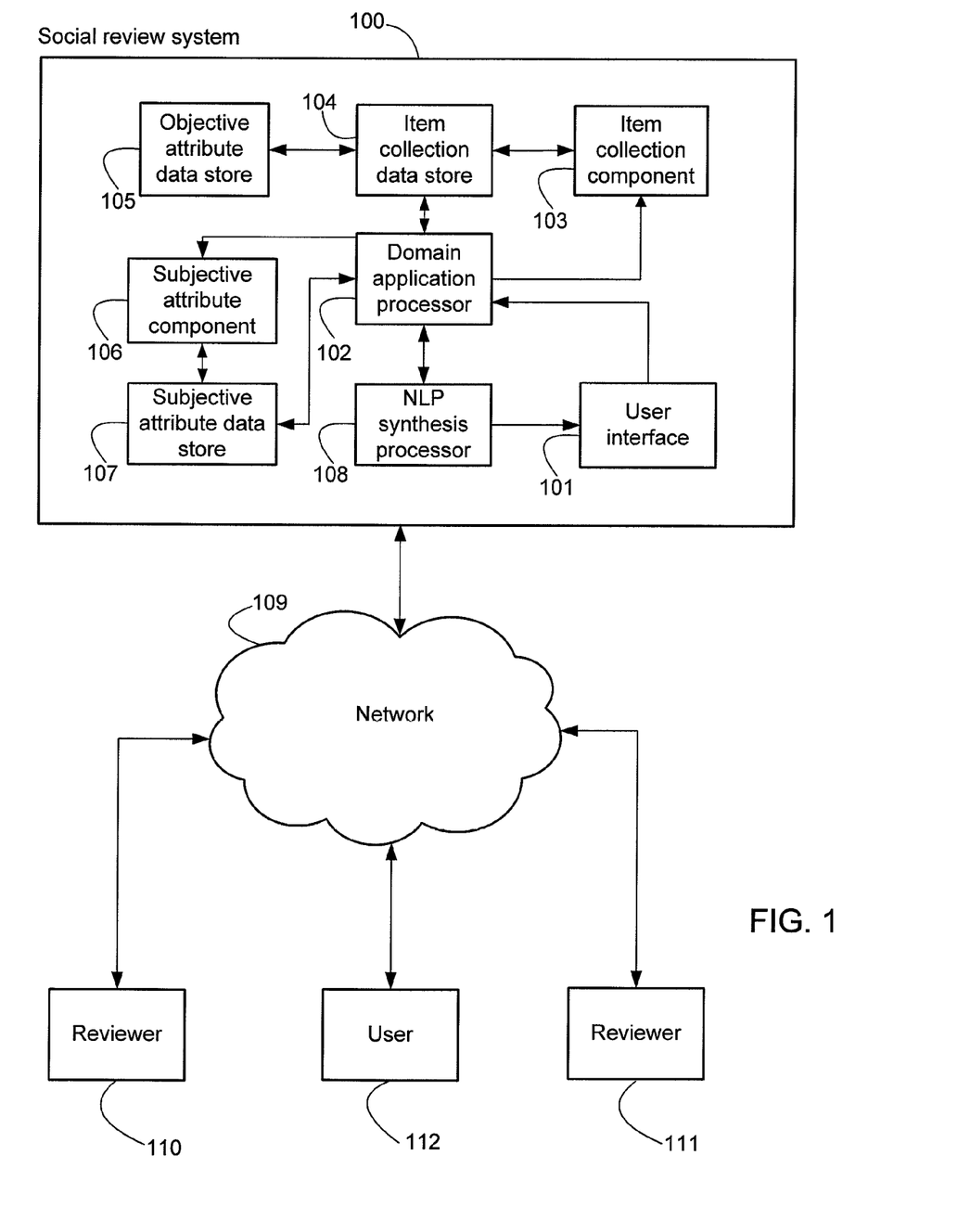
FIG. 1 is a block diagram presenting a system for annotating and ranking reviews with automatically inferred analytics, according to one embodiment of the present invention.

FIG. 1 presents a block diagram depicting a system for annotating and ranking reviews with automatically inferred analytics, according to one embodiment of the present invention. According to the embodiment of FIG. 1, a social review system 100 comprises one or more software and hardware components operative to facilitate annotating and ranking reviews with inferred analytics including, but not limited to, a user interface 101, a domain application processor 102, an item collection component 103, an item collection data store 104, an objective attribute data store 105, a subjective attribute component 106, a subjective attribute data store 107 and an NLP synthesis processor 108.

The social review system 100 is communicatively coupled with a network 109, which may comprise a connection to one or more local or wide area networks, such as the Internet. Clients 110, 111 and 112 comprise reviewers and users who access the social review system 100 from client devices, with reviewers uploading reviews of specific items of content and users reading such reviews. A client device may, for example, comprise a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 100 GB of hard drive storage space and an Ethernet interface to a network. Other client devices are considered to fall within the scope of the present invention including, but not limited to, hand held devices, set top terminals, mobile handsets, etc.

A given client 110, 111 and 112 typically runs software applications, such as a web browser (not pictured), which provide for transmission of queries, as well as display of retrieved result sets comprising items of content with objective attributes, subjective attributes and annotations. Client 110, 111 and 112 initiates a query over the network 109 for a given item of content from a collection of items in a domain, such as, for example, a collection of movies or restaurants, on a social review system 100. A collection of items may comprise a subset of a universe of potential items of content and may have short descriptions, which users may perceive as meaningful for the purpose of rating or review.

An Attribute Collection (hereinafter, "AC") may comprise one or more common attribute-value pairs. An AC, for example, may comprise: cuisine-French, location-Manhattan. The AC illustrated herein would comprise a subset content directed towards restaurants, comprising French restaurants located in Manhattan. The user interface 101 generates a display of the attribute-value pairs of a given item of content, which may accompany a review or ranking that the system provides to a user in response to a query from the client 110, 111 and 112 for a specific item of content.

The subset of an AC may be defined as a Socially Meaningful Item Collection (hereinafter "SMIC"). One example of a SMIC may comprise a collection of movies on a social review system. Social meaningfulness of a SMIC may be determined by various techniques. According to one embodiment, social meaningfulness may be determined by manual selection by an editor of the social review system 100. Such editor may select individual items of content with similar attributes and group them together into a SMIC. For example, movies starring Johnny Depp, or Woody Allen Comedies, may be grouped together. According to an alternate embodiment of the present invention, social meaningfulness may be determined by statistical analysis of the items of content in accordance with statistical techniques known to those of skill in the art. For example, social meaningfulness may be determined based on the uniform distribution of reviews in the SMIC.

A given item of content in a SMIC may comprise at least one objective attribute that is shared by other items of content in the SMIC, with a given objective attribute having a corresponding value. According to one embodiment, the objective attributes for a restaurant item of content may comprise: type of cuisine, the location, and the name of the chef. The corresponding values may comprise: French, Manhattan, and Jean Georges. According to another embodiment, the objective attributes for a movie item of content may comprise: title, actor, and genre. The corresponding values may comprise: Mission Impossible, Tom Cruise, and Action.

A Socially Meaningful Attribute Collection (hereinafter "SMAC") comprises an AC from which meaningful context may be generated. The abovementioned example of cuisine-French, location-Manhattan, may also be defined as an SMAC because such meaningful context may be generated from this attribute-value pair combination. However, this is not always the case. For example, while cuisine-French, address-Even Numbered Street, does provide an accurate objective attribute-value pair combination, it does not provide any information from which meaningful context may be generated.

Table 2 presents one embodiment of an algorithm for generating a SMAC, which a software application may implement to generate a SMAC:

TABLE 2

Algorithm 1 Generation of the SMACS

Require: L : list of pairs (movie,attribute - value).
1: $SMAC_1$ = initializeSMACs(L);
2: k = 1;
3: while $SMAC_k \neq \emptyset$ do
4:    $SMAC_{k+1}$ = generateSMACs($SMAC_k$);
5:    k++;
6: end while
7: return $SMAC_1,...,SMAC_{k-1}$ The algorithm of Table 1 begins with the identification of one or more pairs, for example (movie, attribute-value), (restaurant, attribute-value), etc. The algorithm builds $SMAC_k$, which represent the set of SMACs with exactly k attribute-value pairs. In line 1, $SMAC_1$ is initialized by an initializeSMACs function, which may maintain one or more attribute-value pairs that a given SMAC comprises. The algorithm may use a Boolean function, referred to as isSMAC, to verify coverage with a left-parent fixed to a dummy root. In lines 3 through 6, $SMAC_{k+1}$ is recursively build suing $SMAC_k$ with the function generateSMACs described in Table 3.

TABLE 3

Algorithm 2 generateSMACs : Generation of $SMAC_{k+1}$ from $SMAC_k$

Require: $SMAC_k$.
1: $SMAC_{k+1} = \emptyset$
2: for each (smac1, smac2) with left-parent(smac1)==left-parent(smac2) and isListSmaller(smac1,smac2)) do
3:   if isSMAC(movies(smac1) ∩ movies(smac2)) then
4:     smac = new SMAC;
5:     attribute-values(smac) = attribute-values(smac1) ∪ attribute-values(smac2);
6:     movies(smac) = movies(smac1) ∩ movies(smac2);
7:     left-parent(smac) = smac1;
8:     add smac to $SMAC_{k+1}$
9:   end if
10: end for
11: return $SMAC_{k+1}$ The generateSMAC function may scan one or more pairs of SMAC with the same left-parent and tries to build a new SMAC as a union of their attributes. According to one embodiment, assume that a total order exists on the attribute-value pairs, for example, the order of identifiers in a database, which may be used to define a function (isListSmaller) that compares the lists of attributes of two SMACs in a lexicographic way. Line 3 tests if the union is a SMAC; the elements of the new potential SMAC are exactly the intersection of the elements of the two parents, which is similar to the stability through intersection of the association rules. Line 5 sets list of attributes values for the new SMAC. The algorithm of Table 3 concludes with the return of a set of SMACs, which the algorithm of Table 2 uses to return one or more $SMAC_k$ that have been constructed.

In addition to objective attributes, a given item of content may also be associated with one or more subjective attributes and values. Subjective attributes may comprise user reviews or rankings, and subjective values may comprise the text of such a review or score of such a ranking. The subjective values of a given item of content are generally submitted by clients 110, 111 or 112 to the system. While subjective attributes according to one embodiment may be characterized as general user reviews or rankings of an item of content (e.g., an overall user review or score of a restaurant), the subjective attributes may also be broken down into components. For example, where the item of content is a restaurant, subjective attributes may comprise: quality of the food, décor, service, and cost. A given component may then be reviewed or scored independently. The reviewers of the items of content may comprise both professionals in the trade (e.g., newspaper columnists, magazine editors, and the like), as well as ordinary individuals that frequent the social review system 100. In accordance with one embodiment, ordinary individuals may elevate their status based on the previous number of reviews they have written or their familiarity with a specific item of content.

According to one embodiment of the present invention, a user initiates a query from a client device 110, 111 and 112 for a given item of content. The user interface 101 may present the given item of content for display in conjunction with subjective and objective attributes of the item of content on a client device 110, 111 and 112 via the network 109. Upon a specified event, the user interface 101 may pass the query to the domain application processor 102 to determine whether context exists for the one or more subjective attributes of a given item of content. According to one embodiment, the specified event may comprise simply the loading of a new item of content, for example, the loading of a new web page. In an alternate embodiment, the client 112 may "mouse-over" or otherwise provide focus to a given review of an item of content presented by the user interface 101, causing the domain application processor 102 to determine context. In yet another embodiment, the client 110, 111 and 112 may select an option that the user interface 101 provides, e.g., in the form of a button, to enable context determination for subjective attributes. According to other embodiments, these data may be pre-computed for presentation to the user upon the occurrence of one or more specified events.

According to one embodiment, the domain application processor 102 is operative to determine a context by sending a request for a given item of content to the item collection component 103, which in turn queries the item collection data store 104. The item collection component 103 may comprise a server based computer, and the item collection data store 104 may comprise a database of a specified collection of items of content, such as information regarding restaurants, movies, hotels, etc. The item collection component 103 may match the item of content requested to a reference category, or specific SMIC, relating to the given item of content. For example, if a review concerned the movie item of content, Top Gun, the domain application processor 102 would send a request to the item collection component 103, which in turn, queries the item collection data store 104 to return one or more items of content in the SMIC relating to movies with at least one corresponding attribute-value pair to the movie item of content, Top Gun. Similarly, if a review concerns a restaurant, for example, Bouley, the domain application processor 102 may send a request to the item collection component 103, which in turn may query the item collection data store 104 to return one or more items of content in the SMIC. The one or more items of content in the SMIC relate to restaurants with at least one corresponding attribute-value pair to the restaurant item of content, in the present example being the restaurant Bouley.

The item collection data store 104 may then retrieve the objective attributes and values from the objective attribute data store 105 for one or more items of content returned from the SMIC (relating to movies, restaurants, etc.). According to one embodiment, the objective attribute data store 105 comprises a database that stores the objective attributes and corresponding values for one or more items of content, and is linked to the item collection data store 104. Such objective attributes may include, for example, the title, cast member, and genre, for the SMIC relating to movies. Additionally, the objective attributes for a restaurant may comprise the type of cuisine, the chef, the cost, and the neighborhood or location. The item collection data store 104 returns the items of content with corresponding attribute-value pairs to the domain application processor 102.

The domain application processor 102 may send a request for reviews or other subjective attributes for the collection of items that the item collection data store 104 returns. According to one embodiment, the domain application processor 102 sends the request to the subjective attribute component 106, which in turn queries the subjective attribute data store 107. The subjective attribute data store 107 may comprise a database of such reviews for items of content, including but not limited to, restaurants, movies, hotels, etc. A user review may comprise a short editorial style review of an item of content. For example, if the item of content is a restaurant, such a review may comprise, "this is the best French restaurant I have ever eaten at!" In another embodiment, the user review may comprise a ranked score for a restaurant on a scale from 1 to 100, or according to letter grades (e.g., A+). If the subjective attribute data store 107 contains reviews corresponding to the items of content queried by the subjective attribute component 106, then the subjective attribute component 106 returns these subjective attributes to the domain application processor 102.

The domain application processor 102 may determine whether context exists for a review of a given item of content by providing a reference framework to the user to better understand a given review. According to one embodiment, a reference framework may comprise converting an AC into a SMAC. The domain application processor 102 may be operative to determine a maximum and minimum threshold for the number of objective attribute-value pairs to factor in determining context for a review of an item of content. This can be characterized as a measure of specificity, whereby a set is large enough to provide context, but not so large that the information becomes generic and diluted. For example, by incorporating a greater number of objective attributes, the number of accumulated items of content in the collection decreases. Conversely, by incorporating a lesser number of objective attributes, the number of items of content becomes too large to be useful.

In an exemplary movie reviewing system, the objective attributes may include the actor, director, and genre. By selecting only one attribute (e.g., genre), the item collection may comprise thousands of potential movies, thereby reducing its usefulness. On the other hand, by selecting too many attributes, a single movie item of content itself may become the most specific subset, thereby failing to provide any meaningful context. Similarly, in a restaurant reviewing system, the objective attributes may include the type of cuisine, the chef, the neighborhood, and the cost. By selecting cost only, the item collection may comprise thousands of potential restaurants. On the other hand, by selecting type of cuisine, chef, neighborhood, and cost, a single restaurant by itself may become the most specific subset.

The domain application processor 102 is further operative to determine a minimum threshold for the total number of subjective attributes to factor in determining meaningful context for a review of an item of content. According to one embodiment, internal co-reviews are used to determine meaningful context. Internal co-reviews may comprise the number of pairs of reviews where both items of content reviewed belong to a given SMIC, and for which a given reviewer provides a review for both items of content. This criterion reflects that reviewers have a propensity to rate items of content belonging to the same SMACs. For example, a reviewer who has rated one Woody Allen comedy, is more likely to rate other Woody Allen comedies. Upon reaching a satisfactory minimum threshold, the AC is culled down to a useful number of attribute-value pairs, thereby establishing a SMAC and generating meaningful context for a given review. According to other embodiments, different combinations or permutations of objective and subjective attributes create meaningful context. Depending on the type of attribute in the subset of items, different thresholds are necessary to determine social meaningfulness. For example, the attribute of an actor generally requires more movies to create meaningful context than would the attribute of director (because actors typically act in more movies than directors direct).

The AC is converted to a SMAC, thereby generating the relevant context and providing a reference framework. The domain application processor 102 transmits the relevant context as a result set of one or more attribute-value pairs to the NLP synthesis processor 108, which converts characteristics of the set to ordinary English for display via the user interface 101 as an annotation for a given review. NLP, or natural language processing, is a subfield of artificial intelligence and computational linguistics that provides for automated generation and understanding of natural human languages. Typical natural language generation systems convert information from computer databases into human language, e.g., English. Table 1 presents exemplary pseudo-code that illustrates a technique for translating a result set into English phrases in accordance with one embodiment of the present invention:

TABLE 1

Require: movie m,
  1:  $L_s$ = list of SMACS associated to m and ordered by specificity;
  2:  $L_r$ = list of reviews of m;
  3:  for (r in $L_r$) do
  4:    u = user who has written r;
  5:    if u ∈ $u_{one}$ then
  6:      Annotate r with "This is the only review by u in the system"
  7:    else
  8:      N = 0; i = 0;
  9:      while (N ≦ 1 and i <length($L_s$)) do
10:        N = number of reviews of u in $L_s$[i];
11:        i++;
12:      end while
13:      AC = $L_s$[i − 1]
14:      if N == 1 then
15:        Annotate r with "This is the only review by u of an AC movie out of his <X reviews>".
16:      else
17:        if N > thresh then
18:          Annotate r with "u rated <X AC movies>; he rates this movie better/worse than K of them; he likes these movies more/less than the average reviewer".
19:        else
20:          Annotate r with "u rated <N AC movies>; he rates this movie better/worse than K of them".
21:        end if
22:      end if
23:    end if
24: end for According to the pseudo-code of Table 1, some exemplary phrases include: "this is the only review by [the reviewer] in the system," "this is the only review by [the reviewer] of an [genre] movie out of his [number of reviews] reviews," and "[the reviewer] rated [number of reviews] [genre] movies. He rates this movie better than [number of movies he rated worse]." The user interface 101 displays the translated result set to a client 110, as an annotation for a given review. The annotation thus provides a reference framework by which the user may better understand a given review. Furthermore, annotations may solely comprise subjective attributes, for example, 80% of raters consider this pan more convenient than the pan you bought on Dec. 20, 2005," referring to a pan that the user previously purchased. Likewise, annotations may solely comprise objective attributes, for example, "this pan is about half pound heavier and 20% larger than the pan you bought on Dec. 20, 2005," also referring to a pan that the user previously purchased.

In another embodiment, the result set can be employed to rank the reviews according to context. A review by a given client 110, 111 or 112 with a strongest contextual score may be placed first in a hierarchy of reviews. The user may read the review along with the accompanying annotation or rank, and interpret the review within the reference framework to make more informed decisions regarding the given item of content.

Figure 2A:
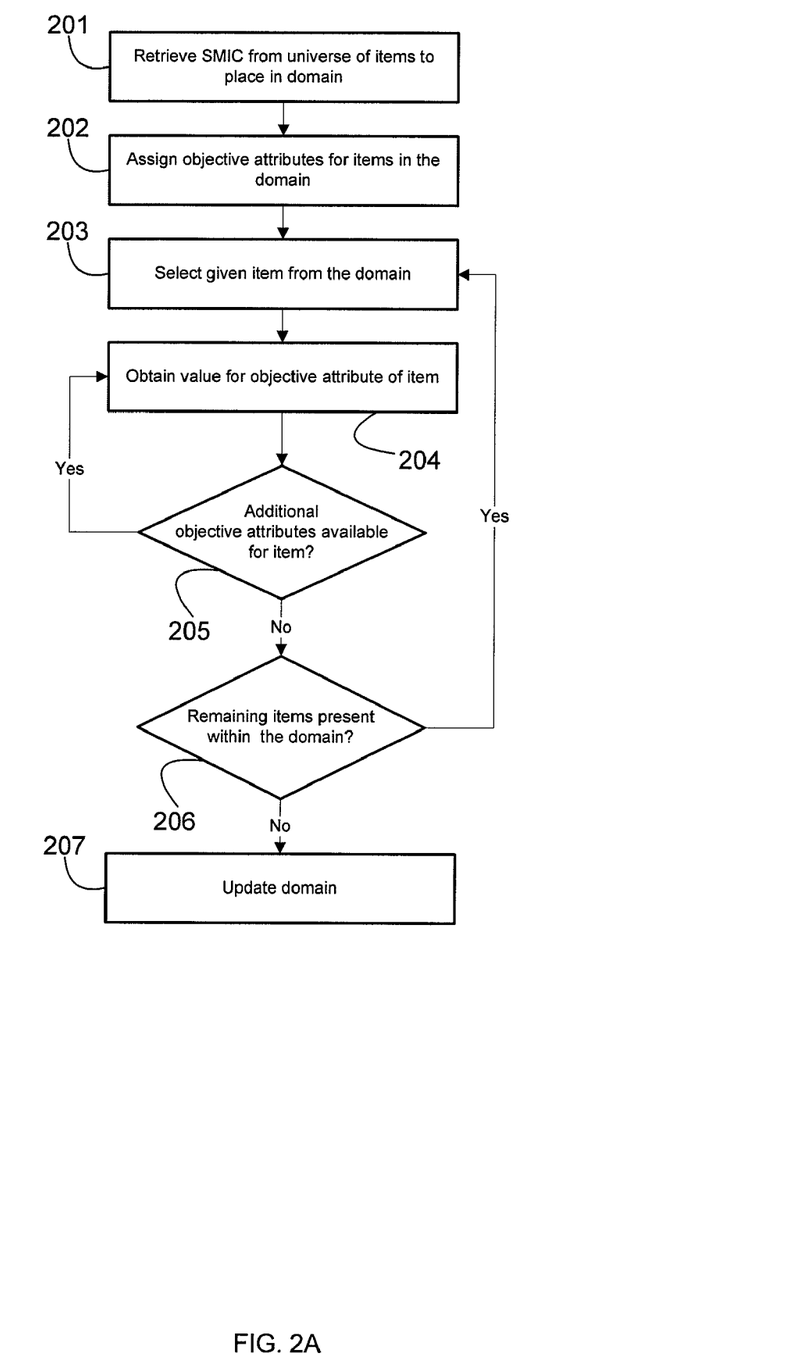
FIG. 2A is a flow diagram presenting a method for defining an item collection according to objective attributes, according to one embodiment of the present invention.

FIG. 2A illustrates a flow diagram depicting one embodiment of a method for using the system of FIG. 1 to identify a SMIC by one or more objective attributes according to one embodiment of the present invention. According to the method of FIG. 2A, a SMIC from a universe of items of content is identified for placement in a domain, step 201, and one or more objective attributes are assigned to the items of content within the SMIC, step 202. The SMIC may comprise items of content on the basis of a relevant category, with such categories including, for example, movies, restaurants, or hotels. For example, movies from the universe of items of content may be placed in a domain and relevant objective attributes, such as title, actor, and genre may be assigned to a given movie in the domain. In another example, restaurants with the relevant objective attributes such as the restaurant name, type of cuisine, chef, neighborhood or location, and cost, may be placed in a domain.

A given item of content is selected from the domain, step 203, and a value for the objective attribute of the item of content is obtained, step 204. Returning to the previous examples, if the movie was Pirates of the Caribbean, values for the objective attributes may comprise "Pirates of the Caribbean" for the title, "Johnny Depp" for an actor, and "Adventure" for a genre. Additionally, if the restaurant was, for example, Daniel, values for the objective attributes may comprise, "Daniel" for the name of the restaurant, "French" for the type of cuisine, "Daniel Boulud" for the chef, "Upper East Side" for the neighborhood, and "Very Expensive" for the cost. If there are additional objective attributes available for the item of content, step 205, then the values for those objective attributes are obtained, step 204. Such additional objective attributes, for example, may comprise additional cast members, stylistic approaches, cinematography, etc. when dealing with movies, and age, décor, trendiness, when dealing with for restaurants.

If there are no additional objective attributes, step 205, then remaining items of content are searched for within the domain, step 206. If there is a remaining item of content present in the domain without a value paired to an objective attribute, step 206, the item of content is selected, step 203, and values for the objective attributes of the item of content are obtained as described above, step 204. If no additional items of content are present within the domain, step 206, the domain is updated to reflect its completion, step 207. Accordingly, items of content in a domain may be characterized according to their objective attribute-value pairs. According to one embodiment, an AC is a set of pairs ($att_i$, $value_i$) that identify an item collection consisting of one or more the items of content in the universe of items of content that have the same value for a given attribute $att_i$ in the AC.

Figure 2B:
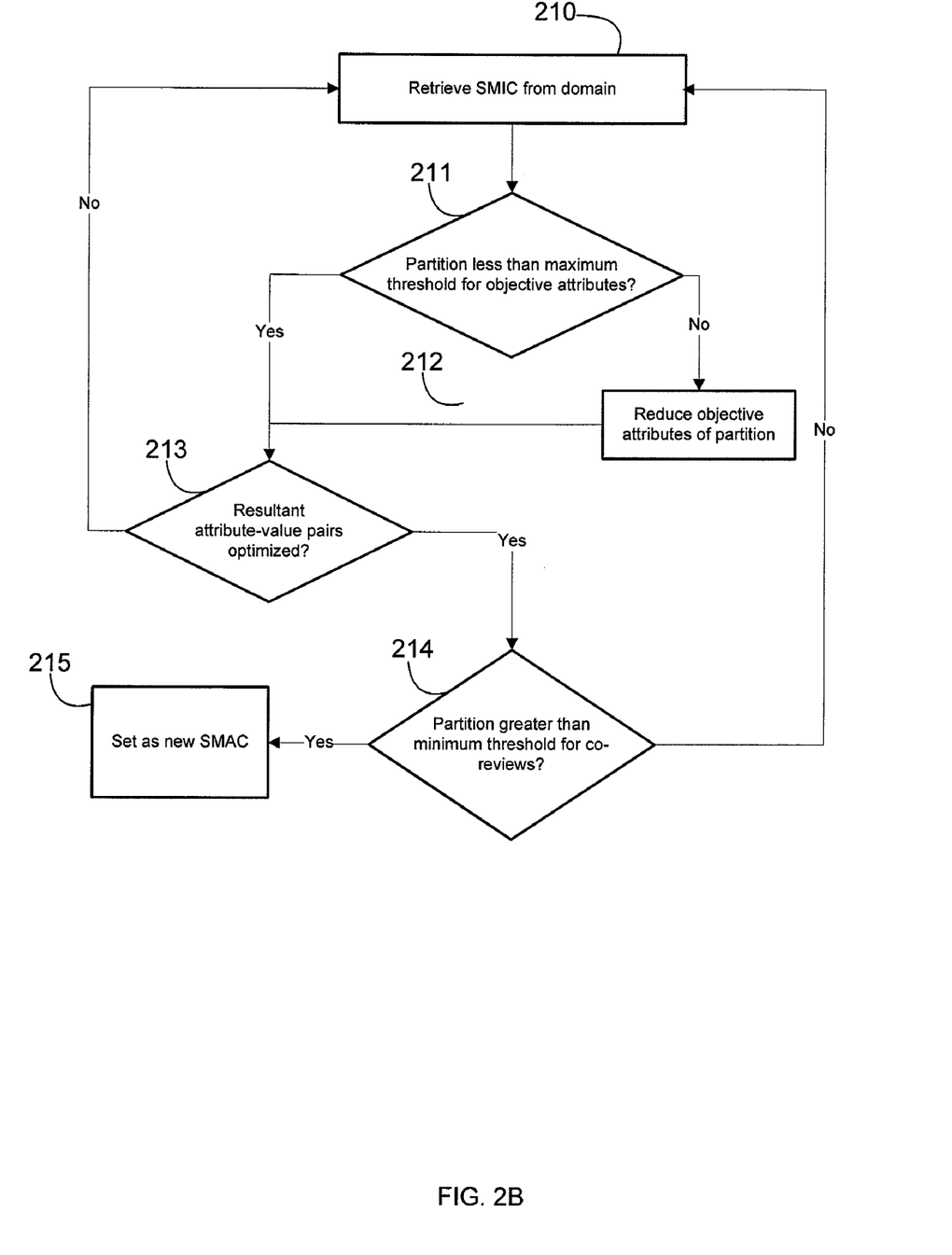
FIG. 2B is a flow diagram presenting a method for extracting context from an item collection, according to one embodiment of the present invention.

FIG. 2B presents a flow diagram illustrating a method for extracting a SMAC from an AC, according to one embodiment of the present invention. An AC is retrieved from the domain, step 210. According to one example, a SMIC comprises movies with the following attributes: director-Steven Spielberg, genre-kids/family, where such movies may comprise "Raiders of the Lost Ark," "Indiana Jones and the Temple of Doom," "E.T.: The Extra Terrestrial," "Jurassic Park," and "Close Encounters of the Third Kind." According to another example, a SMIC may comprise restaurants with the following attributes: cuisine-Italian, chef-Mario Batali, where such restaurants may comprise "Babbo," "Otto," "Lupa," "Esca," and "Del Posto." A determination is made as to whether the size of the AC is less than the maximum threshold for the number of objective attributes, step 211.

If the number of objective attributes comprising the AC is greater than maximum threshold, then the number of objective attributes comprising the AC is reduced, step 212. For example, if the attribute-value pair: actor-Jeff Goldblum, was included in the AC: director-Steven Spielberg, genre-kids/family, then the movie "Jurassic Park" would be the only movie in the AC, thereby making the context unobtainable. Additionally, if the attribute-value pair: price-cheap, was included in the AC: cuisine-Italian, chef-Mario Batali, then "Otto" would be the only restaurant in the domain, also making context potentially unobtainable. Accordingly, one of the attribute-value pairs comprising the AC would be removed in an attempt to generate context.

If the number of objective attributes comprising the AC is below the maximum threshold, it is determined whether the resultant collection of attribute-value pairs is optimized, step 213. According to one embodiment, in order to achieve optimization for context of a movie review, there must be at least ten other movies in the domain. For example, if the AC is defined as actor-Johnny Depp, then the threshold should be at least 10 movies. However, if the AC is defined as director-Clint Eastwood, then the threshold should be at least 5 movies. Those of skill in the art should recognizes that the optimization threshold illustrated herein is entirely application dependent, and different item and attribute sets may require different criteria for optimization.

If the attribute-value pair collection is not optimized, then a new item collection may be retrieved from the domain, step 210. If the collection is optimized, a determination is made as to whether the partition is greater than a minimum threshold for the total number of subjective attributes to achieve social meaningfulness (e.g., internal co-reviews), step 214. Alternate embodiments may utilize other subjective attributes to determine context, for example, the total number of reviews or the total number of co-reviews (not necessarily internal). If partition is greater than the minimum threshold, then the collection is set as a new SMAC, step 215, and context is generated.

Figure 3:
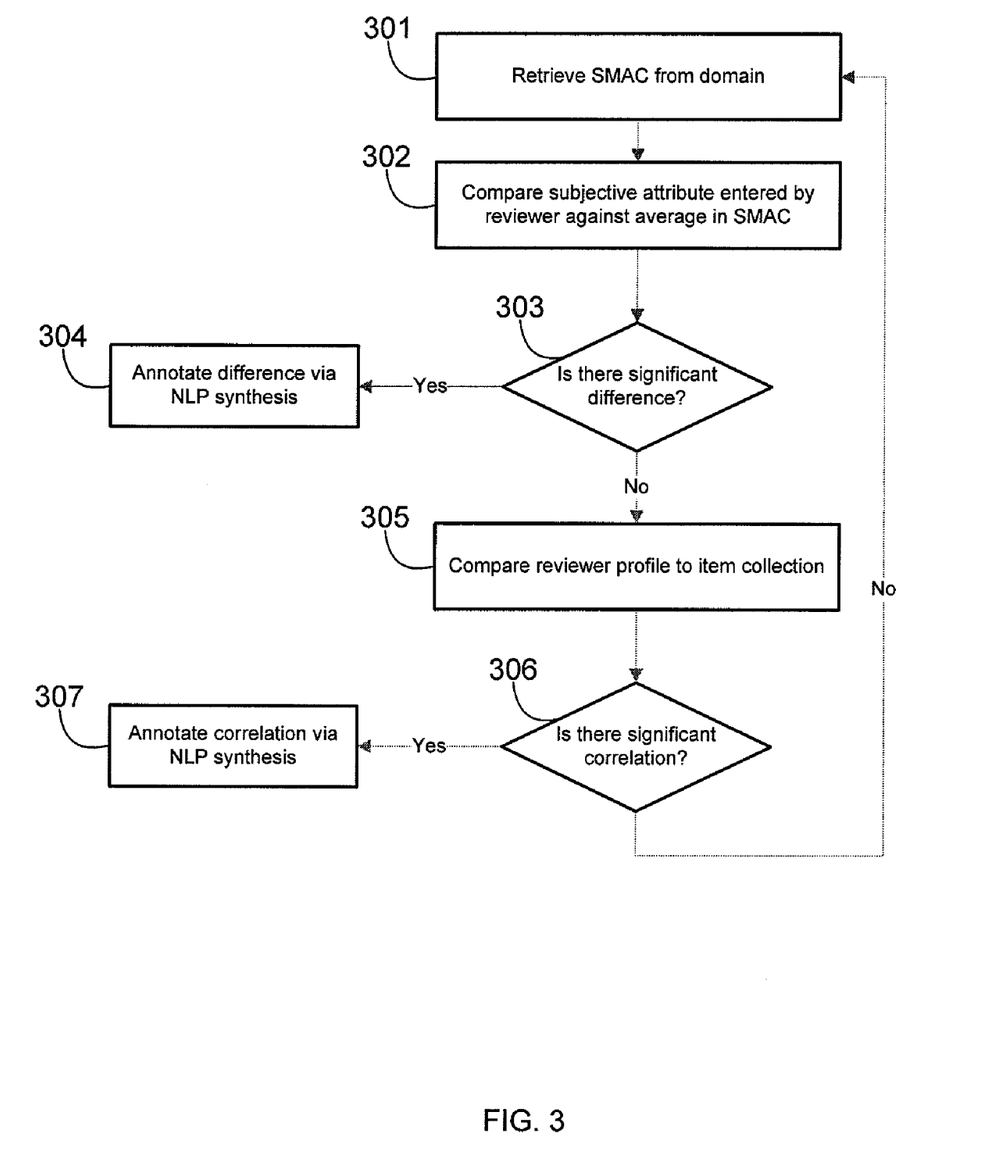
FIG. 3 is a flow diagram presenting a method for annotating and ranking a given review with automatically inferred analytics according to one embodiment of the present invention.

FIG. 3 is a flow diagram illustrating a method for annotating a given review with inferred analytics according to one embodiment of the present invention. According to the flow diagram of FIG. 3, a given SMAC is retrieved from the domain, step 301. For example, one SMAC from the item collection of movies may comprise the attribute-value pairs of (genre, action) and (actor, Bruce Willis). The movies returned in this exemplary SMAC may comprise Die Hard, Die Hard 2: Die Harder, Die Hard: With a Vengeance, The Siege, and Armageddon (all being action films starring Bruce Willis). In another example, an SMAC from the item collection of restaurants may comprise the attribute-value pairs of (cuisine, Italian) and (chef, Mario Batali). The restaurants returned in this exemplary SMAC may comprise Babbo, Otto, Lupa, Esca, and Del Posto (all being Italian restaurants with Mario Batali as the Chef). The subjective value (e.g., review or rank) entered by a reviewer for one or more items of content in a SMAC may be compared to the average value of the subjective attribute of the items of content in the SMAC, step 302. For example, the reviewer may be able to enter a rating for a specific movie or restaurant on a scale of 1 through 100.

If the reviewer rated the movie, Die Hard, with a score of 92/100, and Die Hard: With a Vengeance, with a score of 88/100, these scores would be compared to the rated score of other reviewers of the two movies (assume for the following example that the average user ratings of the two films is 70/100). Additionally, if the reviewer rated the restaurant, Babbo, with a score of 90/100, and Esca, with a score of 50/100, these scores may be compared to the rated score of other reviewers of the two restaurants (assume for the following example that the average user ratings of the two restaurants is 70/100). If there is a significant difference between the two values, step 303, then the corresponding difference is displayed as an annotation via NLP synthesis, step 304. Pseudo-code capable of annotating the differences illustrated by steps 304 and 307, according to one embodiment of the present invention, is illustrated above in Table 1. According to another embodiment of the present invention, a significant difference between one reviewer and the average may be annotated as, "This reviewer's average rating for Bruce Willis action movies is 90/100. This is 20 points higher than the average user." Alternatively, in the context of a restaurant, "This reviewer's average rating for Mario Batali's Italian restaurants is the same as the average user." This context may be useful to a user as a reference framework in judging the relevance of a given reviewer's review.

If there is not a significant difference, step 303, the reviewer's profile is compared to the SMAC, step 305. According to one embodiment, such a user profile may be created by collecting data on a user implicitly, for example, by recording items of content that a user has previously reviewed. If there is a significant correlation between the reviewer's profile and the SMAC, step 306, then the corresponding difference is displayed as an annotation via NLP synthesis, step 307. Such an annotation may comprise, for example, "this user has reviewed every single Bruce Willis action movie ever made," or "this reviewer tends to rate all action movies poorly." In the restaurant example, such an annotation may comprise, "this user has reviewed every single Mario Batali restaurant," or "this reviewer tends to rate all Italian restaurants average." Such annotations provide a reader with context to understand potential biases of the reviewer.

Figure 4:
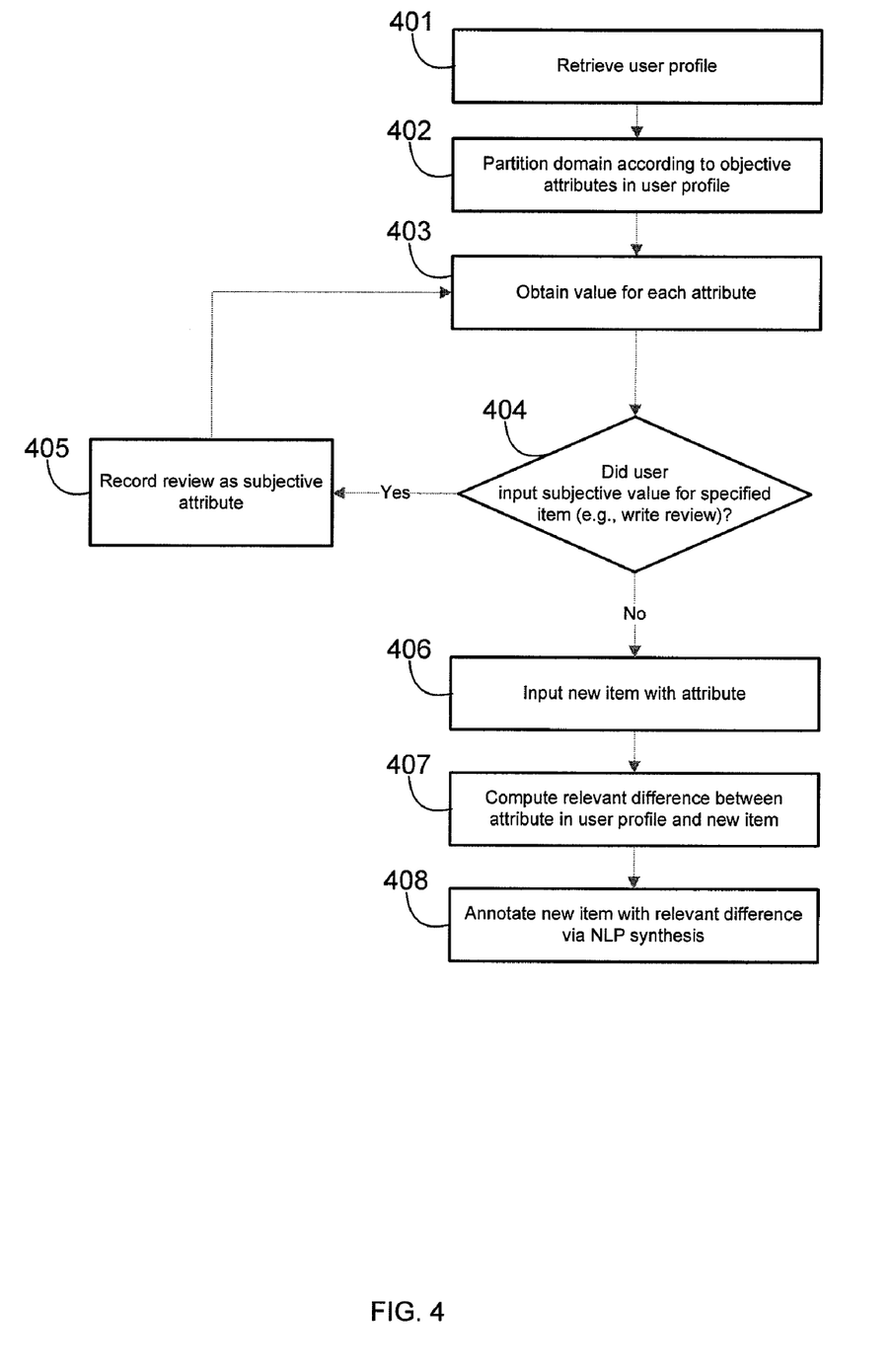
FIG. 4 is a flow diagram presenting a method for annotating and ranking reviews personalized to user experience according to one embodiment of the present invention.

FIG. 4 is a flow diagram presenting a method for annotating and ranking reviews personalized to prior user experience. This method is dependent on the existence of a user profile that stores individual SMACs pertaining to a user. Such a user profile may be built by either collecting data on the user explicitly (e.g., asking him to rate certain items of content on a numerical or sliding scale or asking him to create a list of items of content that he likes), or implicitly (e.g., observing items of content that a user browsed in an online store, keeping a record of the items of content a user has purchased online, or keeping a list of items of content that user has listened to or watched on his computer). Depending on the number of relevant reviews written by the same reviewer, in another embodiment, a user profile may comprise the set of similar items of content that the reviewer has reviewed, the relative rank of the reviewed item of content in a set, a comparison of the reviewer's scores to average scores, and similar information that may indicate biases and competencies of the reviewer.

According to one embodiment of the method, the user's profile is retrieved, step 401. An SMIC in the domain corresponding to the item of content being examined by the user is identified according to objective attributes in a profile for a given user, step 402. For example, if the user is looking at a new skillet online, the domain containing the SMIC for skillets is identified according to an AC of the skillet previously purchased by the user (or similar users), including such objective attributes as the size, weight, material, etc. Values may be obtained for a given attribute, step 403, and if the user has input a review or rank for a given item of content, this may be recorded as a subjective attribute, step 405.

The AC may be used to connect an item of content under consideration by a user who has not rated it to the personal history of that user. If the user has not input a review or rank, step 404, then a new item of content with a correlating attribute-value pair is inputted, step 406. The relevant difference between the value of the attribute of an item of content in the user profile to the new item of content may be computed, step 407, for display as an annotation via NLP synthesis, step 408. For example, one embodiment may comprise, "this frying pan is 4 ounces heavier than the frying pan you bought on Jun. 7, 2005." This form of comparison is most meaningful with objectively similar items of content, recent transactions or interactions, and where a rating of an item of content by a user is close to the average rating within the collection of ratings for the specific item of content. According to another embodiment, if the user has previously reviewed a similar item of content in the domain, an annotation may comprise, "This Woody Allen comedy is rated better than 4 out of 6 Woody Allen comedies that you have rated."

FIG. 5 presents a screen illustration of social review system incorporating inferred analytics, according to one embodiment of the present invention. The embodiment depicted in FIG. 5 integrates an annotation 502 and rank score 504 window panes into an exemplary movie review system. In the upper portion of the user interface, an average score rating by critics 506 is provided next to an average score rating by reviewers 508, along with the total number of reviews counted towards the average scores. The SMAC 510 generated for the movie item of content, "Pirates of the Caribbean: The Curse of the Black Pearl (2003)", appears just under the critic and reviewer scores, and comprises the attribute-value pairs of actor: Johnny Depp, actor: Orlando Bloom, actor: Geoffrey Rush, genre: action/adventure, and genre: kids/family. These attribute-value pairs are provided as input to one or more the above-identified algorithms to provide a reference framework and determine context for a given review from a given reviewer.

According to the present embodiment, three user reviews are provided, along with corresponding grade scores based on a numerical scale. The scores are broken down into four components 504: story, acting, direction, and visuals. An overall grade is provided for a given reviewer, which averages the reviewer's four component grades. Next to the overall grades, a conclusion section comprises an annotation 502 intended to provide context for a given review. For example, in the conclusion for the first review, the conclusion states that the "reviewer rated 10 action/adventure movies. He rates this movie better than 5 of them. He likes action/adventure less than the average reviewer." In the conclusion for the second review, the conclusion states that the "reviewer rated 5 movies starring Johnny Depp. He rates this movie better than 4 of them." These examples of context are determined by comparing a profile for the reviewer to the SMAC 510.

While the invention has been described and illustrated in connection with various embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

We claim:

1. A method for annotating and ranking a user review personalized to prior user experience, the method comprising:
    generating a collection of content items for which a user has previously expressed interest, the collection of content items including objective attributes of interest indicated by the user for each of the content items, subjective attributes of interest indicated by the user for each of the content items by assigning a user-defined subjective value and a reference to the collection of content items stored in a user profile;
    identifying a new content item that is not contained in the collection of content items, the new content item comprising one or more objective attributes and one or more subjective attributes, wherein each of the one or more subjective attributes includes a subjective value; and
    providing a reference framework to interpret the new content item in view of one or more common objective attributes of interest by the user for a given one of the one or more content items in the collection of content items, wherein the number of common objective attributes satisfy a threshold, and in view of the one or more subjective attributes for a given one of the one or more content items in the collection of content items, wherein a difference between the user-defined subjective value and the subjective value of each of the one or more subjective attributes for a given one of the one or more content items in the collection of content items is below a threshold.

2. The method of claim 1, comprising creating the user profile by explicitly collecting user data.

3. The method of claim 1, comprising creating the user profile by implicitly collecting user data.

4. The method of claim 1, wherein providing the reference framework comprises comparing one or more objective attributes associated with a given one of the one or more content items in the collection of content items with one or more objective attributes associated with the new content item.

5. The method of claim 1, comprising displaying the reference framework as an annotation that may comprise one or more subjective attributes.

6. The method of claim 5, comprising generating the annotation via NLP synthesis.

7. A non-transitory computer readable media comprising program code that when executed by a programmable processor causes the processor to execute a method for annotating and ranking a user review personalized to prior user experience, the computer readable media comprising:
    program code for generating a collection of content items for which a user has previously expressed interest, the collection of content items including objective attributes of interest indicated by the user for each of the content items, subjective attributes of interest indicated by the user for each of the content items by assigning a user-defined subjective value and a reference to the collection of content items stored in a user profile;
    program code for identifying a new content item that is not contained in the collection of content items, the new content item comprising one or more objective attributes and one or more subjective attributes, wherein each of the one or more subjective attributes includes a subjective value; and
    program code for providing a reference framework to interpret the new content item in view of one or more common objective attributes of interest by the user for a given one of the one or more content items in the collection of content items, wherein the number of common objective attributes satisfy a threshold, and in view of the one or more subjective attributes for a given one of the one or more content items in the collection of content items, wherein a difference between the user-defined subjective value and the subjective value of each of the one or more subjective attributes for a given one of the one or more content items in the collection of content items is below a threshold.

8. The computer readable media of claim 7, comprising program code for creating the user profile by explicitly collecting user data.

9. The computer readable media of claim 7, comprising program code for creating the user profile by implicitly collecting user data.

10. The computer readable media of claim 7, wherein program code for providing the reference framework comprises program code for comparing the one or more objective attributes associated with a given one of the one or more content items in the collection of content items with one or more objective attributes associated with the new content item.

11. The computer readable media of claim 7, comprising program code for displaying the reference framework as an annotation that may comprise one or more subjective attributes.

12. The computer readable media of claim 11, comprising program code for generating the annotation via NLP synthesis.

* * * * *